Dec. 5, 1967  G. AUGUSTIN  3,355,770
DEVICE FOR THE WRINKLE-FREE FLATTENING AND COOLING
OF A SEAMLESS THERMOPLASTIC FOIL TUBE
Filed Feb. 10, 1966

INVENTOR.
Günter Augustin
BY
ATTORNEY 3,355,770
DEVICE FOR THE WRINKLE-FREE FLATTENING AND COOLING OF A SEAMLESS THERMOPLASTIC FOIL TUBE
Guenter Augustin, Ennepetal, Ruggeberg, Germany, assignor to Barmer Maschinenfabrik Aktiengesellschaft
Filed Feb. 10, 1966, Ser. No. 526,493
Claims priority, application Germany, Feb. 28, 1965, B 80,770
6 Claims. (Cl. 18—14)

ABSTRACT OF THE DISCLOSURE

Apparatus for extruding thermoplastic foil tubing including a ring nozzle through which the thermoplastic material is extruded in the form of tubing, pinch-off rollers through which the extruded tubing passes, means for inflating the portion of said tubing between the nozzle and the rollers, and cooled main guide means on either side of said tubing which flatten said tubing and cool it as it approaches said rollers. Auxiliary cooled guide plates near the outer ends of said main guide plates contact and additionally cool said tubing.

Background of the invention

The invention relates to a device for the wrinkle-free flattening and cooling of a seamless thermoplastic foil tube before it enters the squeeze roll slot of an extrusion apparatus. This device has two guide plates leading to the slot; the guide plates have a double wall for receiving a cooling means, can be adjusted to the transporting direction of the tube in the manner of a pitched roof, and can be placed against the circumference of the tube. By means of such an arrangement, the inside cross section of the tube changes from the shape of a circle to a flattened and increasingly lengthened, rectangle-type cross section, and from that shape to a closed double line.

In order to produce seamless tube foils, particularly for the purpose of manufacturing bags of polyethylene, polyvinyl chloride or other thermoplastics, the melt forced out from an extruder by a ring nozzle is conventionally blown up to a tube, thereby being cooled, and is flattened by means of guide plates and squeeze rolls in order to be finally processed further in this band-shaped form or to be reeled up. However, when conducting these measures, difficulties are often encountered because the foil tubes, particularly those having a larger tube diameter or wall thickness, experience adhesion of the closely contacting foil walls caused by the squeeze rolls, on account of insufficient or non-uniform cooling between the extrusion head and squeeze rolls. The separation of the adhered spots or strips then becomes necessary for further continuous processing. It is therefore necessary to cool the foil tubes to such a degree that no adhesion is caused by the pressure of the squeeze rolls. In case of a short distance between the blowing head which blows air into the newly formed tube and the squeeze rolls the flattening zone is incorporated into the cooling section by making the conventional two guide plates of a double wall construction so that a cooling medium can flow therethrough. Experience has shown, however, that a uniform cooling across the entire tube circumference cannot be obtained in this manner because of the transit path differences along the cooling surfaces of the guide plates. With increasing delivery speed adhesion is observed occurring at first in a band along the side margins on both sides of the flattened foil tube and gradually increasing from there to the center of the tube. The lateral margins which form folds when the tube is flattened, hardly touch the cooling surfaces of the guide plates and are thus particularly subject to adhesion. The pair of guide plates per se has definitely proved useful as a simple and effective means to flatten foil tubes in a wrinkle-free manner and by establishing a sufficiently long cooling path, inner adhesions of the foil material are avoided.

Summary of the invention

It is an object of this invention to obviate in a relatively short cooling section, the disadvantage of having a non-uniform cooling across the circumference of the tube.

In accordance with this invention there is provided, in addition to the conventional pair of guide plates, at least two further, adjustable cooling plates constructed essentially in the form of trapezoidal or triangular front surface guide elements and provided to be pivotable and/or insertable at or in the free flanks of the roof-shaped guide component present in the apparatus, until these front surface guide elements contact the foil tube. By this simple measure, the tube is encompassed on all sides by cooling guide elements, and is compressed, from a cross section which was first cylindrical, to an approximately rectangular cross section, the latter becoming increasingly flatter and thus simultaneously broader in the conveying direction. The tube is thus subjected along its entire circumference to a uniform cooling. Although the length of the conventional cooling section is not increased, there is obtained an increase in the delivery speed and thus in the output of an extrusion device for producing foil tubes of, for example, a diameter of 380 mm. and a wall thickness of 0.25 mm., of up to 100% and more.

For adjusting to any desired tube diameter, the cooling plates are provided with a special adjusting mechanism for pivoting and/or lateral shifting and for fixing in the desired position. However, the additional cooling plates can also be joined laterally to the roof-type guide plates. It is likewise possible to provide, in place of one cooling plate, two or several such plates, or to combine them, in such a manner that they together substantially fill the free flank region of the roof-shaped guide arrangement.

The cooling plates are fashioned to be double walled for receiving a coolant. Particularly effective, however, are such cooling plates which are composed of commercial ribbed pipes as they are used, for example, in the heating technique. Therefore, in a further development of the invention, the use of such ribbed pipe elements is contemplated, particularly those having approximately honeycomb-shaped cross sections, for constructing the cooling plates wherein the conduits for the cooling liquid are positioned side-by-side in a plane and at right angles to the conveying direction of the foil tube and are connected with one another in such a manner that they form a cooling coil in their entirety, this coil being provided at one plate end with an inlet for the cooling liquid and at the other plate end with an outlet for this cooling liquid. The particular advantage of this arrangement, in addition to obtaining an intense cooling effect, at the margins of the tube foil, is that the friction of the tube foil at the surface of the cooling plates is decreased.

Other objects and many advantages of the invention will become apparent to those skilled in the art, after study of the following detailed description, in connection with the accompanying drawing.

Brief description of the drawing

In the drawing, an embodiment of the invention is schematically illustrated.

Description of the preferred embodiment

Figure 1:
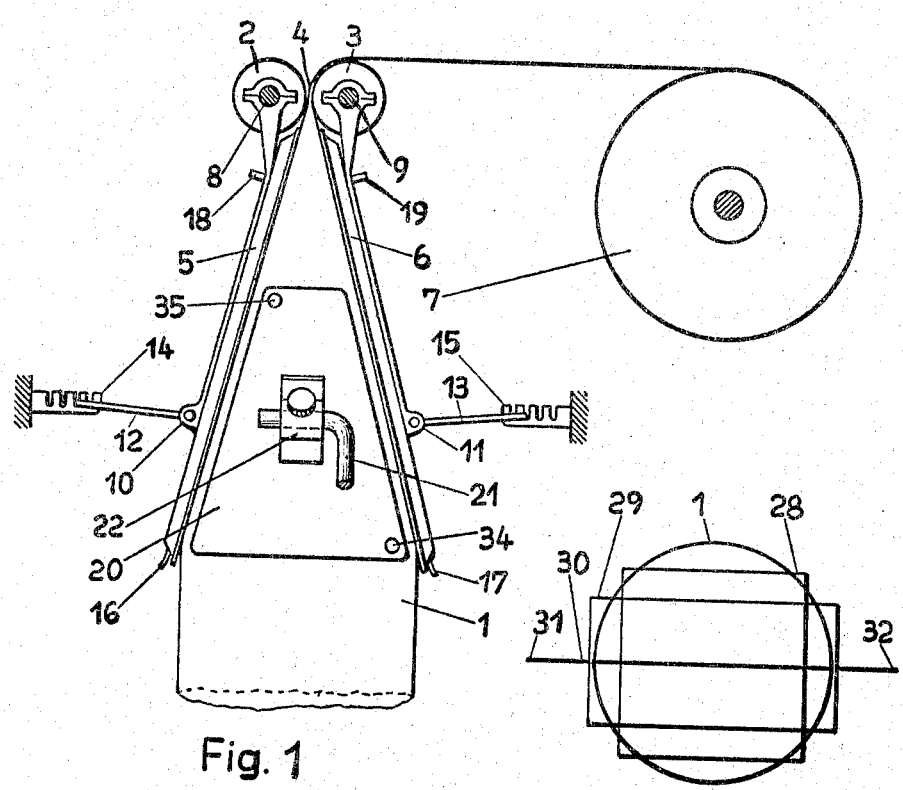
FIG. 1 shows the entire construction of the flattening and cooling device, in lateral view.

The thermoplastic foil tube 1 delivered from the blowing head (not shown) of an extrusion device in a blown-up shape and precooled in a manner not illustrated in detail is converted to a flattened form, before it enters the slot 4 formed by the squeeze rolls 2 and 3, by means of the two roof-shaped guide plates 5 and 6, continuously varying the shape of its cross section. In this flattened form, the foil tube is wound up into a roll 7, after passing through the slot 4 and over one or several supporting rollers, with the aid of a special device (not shown). However, it is possible to cut the flattened foil tube, after passing the squeeze roll slot, along its margins and to wind up the two foil bands separately from each other.

In the illustrated embodiment, the two guide plates 5 and 6 having double walls for receiving a coolant are each mounted on one of the squeeze roller shafts 8 and 9 and are pivotable around the same; further, these plates can be fixed in their position by means of the locking pawls 12 and 13 joined to the plates at 10 and 11 by inserting the pawls in the stationary locking devices 14 and 15 with a predetermined adjustment angle. The coolant which is fed continuously enters, via pipe connections which are not shown at one end of the plates at 16 and 17, and exits again at the other end thereof at 18 and 19. The flow direction of the coolant through the guide plates, can, however, also be provided in the opposite direction.

Figure 2:
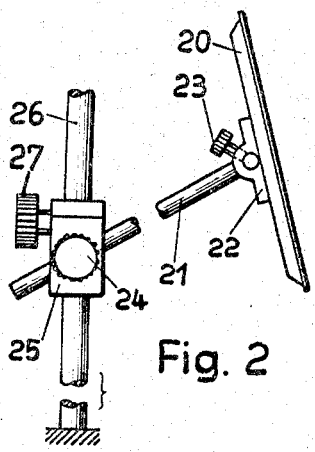
FIG. 2 shows the adjusting mechanism for the cooling plates of FIG. 1.

In accordance with the invention, there is provided at the free sides of the foil tube 1, at both sides of the roof-type guide arrangement 5, 6, respectively at least one additional cooling plate 20 in the shape of a substantially trapezoidal front surface guide element, pivotable until it contacts the foil tube 1. This cooling plate 20 is affixed, in the example illustrated, to a supporting rod 21 pivotable with its angled end and being displaceably seated in the bearing block 22, this bearing block being fixedly connected with the plate; the rod can be fixed in one position by means of a clamping lever, a set screw 23, or the like. The free end of the supporting rod 21 is inserted movably and fixedly mountable by means of a set screw 24, in the adjustment bushing 25, this bushing being provided to be displaceable on a stationary support 26 and being rotatable, and also being fixable in its position by means of a set screw 27. This can be seen from FIG. 2. By means of this construction, the cooling plate 20 can be placed in any desired position and can thus be accurately adjusted to the respective diameters and cross sections of each particular tube.

Figure 3:
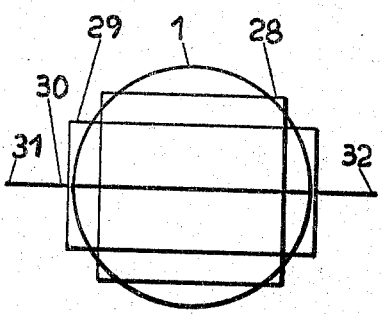
FIG. 3 shows the changes in the cross-sectional shape when flattening the foil tube by means of the device of FIG. 1.

In this manner, as depicted in FIG. 3, the tube 1 first blown up to a cylindrical shape is converted to the flattened shape 30 via rectangular cross sections 28, 29 becoming ever flatter and longer; during this process, the tube is also cooled at its edges and particularly in the lateral folds 31, 32 produced during the flattening process, to such an extent that the adhesion by the squeeze rolls does not occur and the extrusion device can operate without difficulty with a substantially increased delivery speed.

Figure 4:
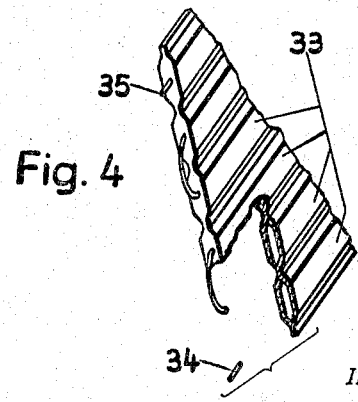
FIG. 4 shows a perspective view of a section of a cooling plate.

Finally, FIG. 4 shows the internal construction of the cooling plates, made up of ribbed pipes 33 having a honeycomb-like cross section, these pipes extending at right angles to the direction of motion of the tube 1 and being connected at their ends in such a manner that they represent, in their entirety, a cooling coil whose inlet 34 for the cooling liquid is provided, for example, at the lower end of the plate and whose exit 35 is at the upper end of the plate as indicated by the arrows.

It should be understood of course that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

The invention claimed is:

1. An extrusion apparatus for forming flattened thermoplastic foil tubing, comprising:
   extrusion means including an extrusion head for forming unflattened thermoplastic foil tubing;
   inflating means for inflating the newly extruded tubing with an inflating fluid under superambient pressure;
   a pair of closely spaced squeeze rolls mounted for rotation about parallel axes spaced from said extrusion head,
      said tubing passing between said squeeze rolls, and said squeeze rolls forcing the opposite walls of said tubing into contact and thereby substantially impeding the escape of said inflating fluid from within said newly extruded tubing;
   a pair of main guiding and cooling plates having closely spaced edges adjacent said rolls,
      said tubing passing between said closely spaced edges just prior to passing between said rolls, and contacting said main plates over cooling areas extending substantially to the maximum diameter of the unflattened tubing;
   cooling means for cooling said main plates by circulation of a cooling fluid in heat exchanging relationship therewith;
   auxiliary cooling plates contacting substantial areas of said tubing,
      said main and auxiliary cooling plates being of such configuration that said tubing is cumulatively subjected to substantially uniform cooling throughout its circumference during its passage from said extruding head to said rolls;
   and cooling means for cooling said auxiliary cooling plates by circulation of a cooling fluid in heat exchanging relationship therewith.

2. An extrusion apparatus as claimed in claim 1 in which said main cooling and guiding plates are angularly adjustable about axes parallel to the axes of said rolls, and are provided with locking means whereby each of them may be fixed in at least a finite plurality of positions.

3. An extrusion apparatus as claimed in claim 2 in which said auxiliary cooling plates are angularly adjustable about axes substantially perpendicular to the axes of said rolls, and are provided with locking means whereby each of them may be fixed with respect to its associated axis.

4. An extrusion apparatus as claimed in claim 3 in which said auxiliary cooling plates are independently movable toward or away from each other, and are provided with locking means whereby they may be fixed in a plurality of relative positions.

5. An extrusion apparatus as claimed in claim 3 in which said auxiliary cooling plates are movable toward or away from said rolls, and are provided with locking means whereby they may be fixed at a plurality of distances from said rolls.

6. An extrusion apparatus as claimed in claim 1 in which at least some of said plates comprise integral, planar pluralities of conduits the individual conduits of which extend at right angles to the direction of motion of said tubing, said conduits being interconnected for successive passage of said cooling fluid therethrough.

References Cited
UNITED STATES PATENTS
| | | | |
|---|---|---|---|
| 2,544,044 | 3/1951 | Reber et al. | 18—14 X |
| 2,641,022 | 6/1953 | Kress | 18—14 X |
| 3,221,370 | 12/1965 | Corbett. | |
| 3,230,582 | 1/1966 | Hoffman et al. | 18—12 |
| 3,238,564 | 3/1966 | Fry | 18—14 |
| 3,274,317 | 9/1966 | Batosti et al. | 18—14 X |

FOREIGN PATENTS
| | | |
|---|---|---|
| 571,392 | 2/1959 | Canada. |
| 981,736 | 1/1965 | Great Britain. |

WILLIAM A. STEPHENSON, *Primary Examiner.*